US008070425B2

(12) United States Patent
Roberts et al.

(10) Patent No.: US 8,070,425 B2
(45) Date of Patent: Dec. 6, 2011

(54) TURBOCHARGER WITH SLIDING PISTON, AND HAVING VANES AND LEAKAGE DAMS

(75) Inventors: Quentin Roberts, Nancy (FR); Ahmed Alnega, Thaon Les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 922 days.

(21) Appl. No.: 12/058,052

(22) Filed: Mar. 28, 2008

(65) Prior Publication Data
US 2009/0246003 A1 Oct. 1, 2009

(51) Int. Cl.
*F01B 25/02* (2006.01)
(52) U.S. Cl. ........................ 415/157; 415/165
(58) Field of Classification Search .................. 415/157, 415/158, 159, 165, 208.4, 209.1
See application file for complete search history.

(56) References Cited

U.S. PATENT DOCUMENTS

| 5,178,516 A * | 1/1993 | Nakagawa et al. ........ 415/208.3 |
| 5,231,831 A * | 8/1993 | Leavesley ........................ 60/602 |
| 6,726,447 B2 * | 4/2004 | Lutz ............................... 415/158 |
| 7,810,327 B2 * | 10/2010 | Parker ............................. 60/602 |

* cited by examiner

*Primary Examiner* — Edward Look
*Assistant Examiner* — Andrew C Knopp
(74) *Attorney, Agent, or Firm* — Alston & Bird LLP

(57) ABSTRACT

A turbocharger having a sliding piston for regulating exhaust gas flow into the turbine wheel includes a set of first vanes mounted on a fixed first wall of the turbine nozzle and projecting axially toward an opposite second wall of the nozzle, and/or a set of second vanes mounted on the end of the piston and projecting in an opposite axial direction toward the first wall of the nozzle. For the/each set of vanes, there are leakage dams formed on the wall that is adjacent the vane tips when the piston is closed. The leakage dams are closely adjacent the vane tips and discourage exhaust gas from leaking in a generally radial direction past the vane tips as the piston just begins to open from its fully closed position.

25 Claims, 6 Drawing Sheets

TURBOCHARGER WITH SLIDING PISTON, AND HAVING VANES AND LEAKAGE DAMS

FEDERALLY SPONSORED RESEARCH OR DEVELOPMENT

This invention was made with United States Government support under DOE Contract No. DE-FC26-06NT42873 awarded by U.S. Department of Energy. The United States Government has certain rights in the invention.

BACKGROUND OF THE INVENTION

The present disclosure relates to turbochargers having a sliding piston in the turbine nozzle for regulating exhaust gas flow into the turbine.

An exhaust gas-driven turbocharger is a device used in conjunction with an internal combustion engine for increasing the power output of the engine by compressing the air that is delivered to the engine's air intake to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is a center housing connected between the turbine and compressor housings for containing bearings for the shaft. The turbine housing defines a generally annular chamber that surrounds the turbine wheel and that receives exhaust gas from the engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger employs a sliding piston in the turbine nozzle. The piston is slidably mounted in the turbine housing and is connected to a mechanism that translates the piston axially back and forth. Changing the position of the piston has the effect of changing the effective flow area through the turbine nozzle, and thus the flow of exhaust gas to the turbine wheel can be regulated by controlling the piston position. In this manner, the power output of the turbine can be regulated, which allows engine power output to be controlled to a greater extent than is generally possible with a fixed-geometry turbocharger.

Typically the sliding piston mechanism also includes vanes that are either attached to an end of the piston or to a fixed wall of the turbine nozzle. When the piston is fully closed, there is still an opening between the end of the piston and the fixed wall of the nozzle, and the vanes typically extend fully across this opening. However, when the piston begins to open, in some such piston mechanisms a vane-free gap begins to develop either between the end of the piston and the ends of the vanes (when the vanes are mounted on the fixed nozzle wall) or between the ends of the vanes and the nozzle wall (when the vanes are mounted on the piston). This is undesirable because at the moment the gap begins to develop, the flow of exhaust gas around the vane ends and through the vane-free gap has poor aerodynamics, which adversely impacts turbine efficiency. The flow rate into the turbine also tends to change quite abruptly with small changes in piston position during this initial opening movement of the piston, which makes it difficult to control the turbine with accuracy during this transition.

In order to try to overcome such disadvantages, it has been proposed to include slots either in the piston end or in the nozzle wall for the vanes to extend into. In this manner, the vanes can be made long enough so that even when the piston is fully open, the vanes extend fully across the nozzle opening. However, this has its own drawbacks. Because the exhaust gas flowing through the nozzle is very hot, the piston, vanes, and nozzle wall are all subject to dimensional changes caused by thermal growth and contraction as the gas temperature changes. Accordingly, in order to prevent the vanes from binding in the slots at all operating conditions, it is necessary to provide large tolerances. Therefore, there are substantial gaps between the vanes and the edges of the slots that receive the vanes, and the exhaust gas can leak through these gaps. This not only partially defeats the purpose of the vanes, but when the slots are in the fixed nozzle wall they can allow hot exhaust gas to migrate into the center housing where the gas can heat up the bearings, which is highly undesirable.

BRIEF SUMMARY OF THE DISCLOSURE

The present disclosure concerns a turbocharger having a sliding piston, which substantially avoids the drawbacks of prior turbochargers noted above. In accordance with one aspect of the disclosure, the turbocharger includes a set of first vanes mounted on a fixed first wall of the turbine nozzle and projecting axially toward an opposite second wall of the nozzle, and a set of second vanes mounted on the end of the piston and projecting in an opposite axial direction toward the first wall of the nozzle. The two sets of vanes are circumferentially staggered relative to each other and overlap each other in closed and partially open positions of the piston. The turbocharger further comprises a pair of first leakage dams for every first vane, formed as projections from the end of the piston in a direction generally toward the first wall and having axial lengths substantially smaller than the first vanes, each said pair being positioned such that the tip of the respective first vane is between the two first leakage dams when the piston is fully closed. Additionally, there is a pair of second leakage dams for every second vane, formed as projections from the first wall in a direction generally toward the second wall and having axial lengths substantially smaller than the second vanes, each said pair being positioned such that the tip of the respective second vane is between the two second leakage dams when the piston is fully closed.

The leakage dams discourage the exhaust gas from leaking in a generally radial direction past the adjacent vane tips as the piston just begins to open from its fully closed position. When the piston is open, the leakage dams act as "mini vanes" and perform some degree of flow guidance to the exhaust gas flowing through the nozzle.

In one embodiment, the first and second leakage dams comprise elongate ribs extending generally parallel to a flow direction through the first and second vanes, respectively. The ribs have a thickness substantially less than a thickness of the first and second vanes.

In one embodiment, each pair of first leakage dams is approximately midway in a circumferential direction between two second vanes, and each pair of second leakage dams is approximately midway in a circumferential direction between two first vanes.

In accordance with one embodiment, the first vanes have a length from a leading edge to a trailing edge of each first vane, and the first leakage dams have a length from a leading edge to a trailing edge of each first leakage dam, the length of the first leakage dams being about 50% to about 95% of the length of the first vanes.

Similarly, the second vanes have a length from a leading edge to a trailing edge of each second vane, and the second leakage dams have a length from a leading edge to a trailing edge of each second leakage dam, the length of the second leakage dams being about 50% to about 95% of the length of the second vanes.

The leakage dams are substantially shorter in axial length than the vanes. For example, the first leakage dams can have an axial length that is about 5% to 20% of the axial length of the first vanes, and the second leakage dams likewise can have an axial length that is about 5% to 20% of the axial length of the second vanes.

In another aspect of the invention, the leakage dams can be used in turbochargers that have only one set of vanes. For example, in one embodiment, a turbocharger can have vanes on the first wall and leakage dams on the end of the piston. Alternatively, the vanes can be on the end of the piston and the leakage dams can be on the first wall.

It is also within the scope of the invention to have a single leakage dam for each vane, rather than a pair of leakage dams per vane. In this case, each leakage dam can be located either adjacent the convex surface of the associated vane or adjacent the concave surface of the vane. The circumferential distance from the leakage dam to the associated vane on one side of the leakage dam is substantially smaller than the circumferential distance to the vane on the other side of the leakage dam.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

Figure 1:
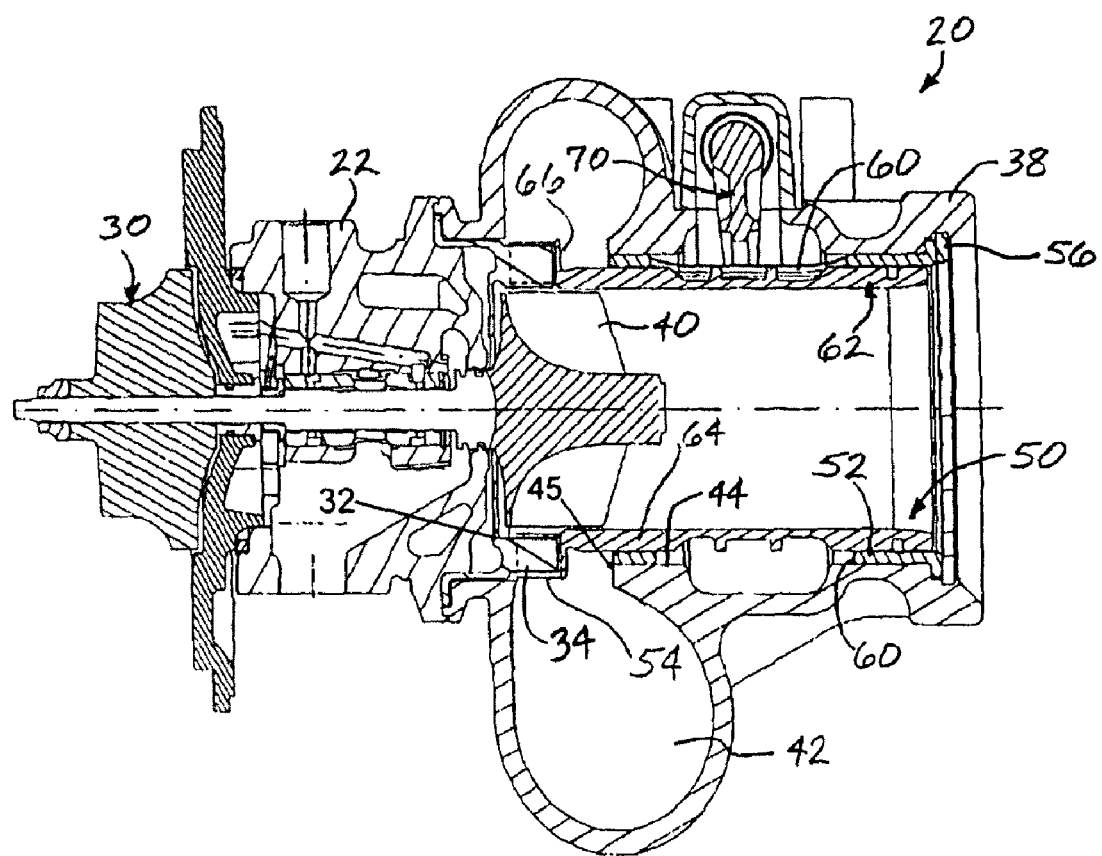
FIG. 1 is a cross-sectional view of a turbocharger in accordance with one embodiment of the invention, with the piston in a closed position.

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A turbocharger 20 in accordance with one embodiment of the invention is shown in FIGS. 1 through 5. The turbocharger includes a center housing 22 that contains bearings 24 for a rotary shaft 26 of the turbocharger. A compressor housing (not shown) is coupled to one side of the center housing. A compressor wheel 30 is mounted on one end of the shaft 26 and is disposed in the compressor housing. Although not illustrated, it will be understood that the compressor housing defines an inlet through which air is drawn into the compressor wheel 30, which compresses the air, and further defines a diffuser through which the compressed air is discharged from the compressor wheel into a volute surrounding the compressor wheel. From the volute, the air is delivered to the intake of an internal combustion engine (not shown). The turbocharger further comprises a turbine housing 38 coupled to the opposite side of the center housing 22. A turbine wheel 40 is mounted on the opposite end of the shaft 26 from the compressor wheel and is disposed in the turbine housing. The turbine housing defines a chamber 42 that surrounds the turbine wheel 40 and receives exhaust gas from the internal combustion engine. Exhaust gas is directed from the chamber 42 through a nozzle 43 (FIG. 2) into the turbine wheel 40, which expands the exhaust gas and is driven thereby so as to drive the compressor wheel.

A nozzle ring or heat shield 32 is disposed between the center housing 22 and turbine housing 38. The heat shield comprises a first wall of the turbine nozzle 43; an opposite second wall 45 of the nozzle is formed by the turbine housing 38. The heat shield 32 supports a set of circumferentially spaced first vanes 34 that extend axially from the heat shield partway across the axial extent of the nozzle 43 toward the second wall 45.

The turbine housing 38 defines a generally cylindrical bore 44 whose diameter generally corresponds to a radially innermost extent of the chamber 42. The turbine wheel 40 resides in an upstream end of the bore 44 and the turbine wheel's rotational axis is substantially coaxial with the bore. The term "upstream" in this context refers to the direction of exhaust gas flow through the bore 44, as the exhaust gas in the chamber 42 flows into the turbine wheel 40 and is then turned to flow generally axially (left to right in FIG. 1) through the bore 44 to its downstream end.

In one embodiment, the turbine wheel can be a "splittered" turbine wheel (not shown) in which there are full-length blades alternating with partial-length blades. An example of such a splittered turbine wheel is described in published PCT application WO 2004/074642 A1 to Lombard et al. entitled "Turbine Having Variable Throat", published on Sep. 2, 2004, the entire disclosure of which is hereby incorporated herein by reference. The full-length blades have a greater length in the axial direction than do the partial-length blades. More particularly, the full-length blades are positioned such that they span substantially the full axial extent of the nozzle 43 when the piston is in the fully open position as in FIG. 2A. The partial-length blades are positioned such that they span the axial extent of the nozzle at least when the piston is closed as in FIG. 1. Accordingly, all of the exhaust gas flowing through the nozzle encounters both the full-length and the partial-length turbine blades when the piston is closed. When the piston is fully open, some of the exhaust gas encounters both sets of blades, but the remainder of the exhaust gas encounters only the full-length blades (i.e., the portions of the full-length blades extending downstream of the trailing edges of the partial-length blades).

The turbocharger includes a sliding piston assembly 50 that resides in the bore 44 of the turbine housing. The piston assembly comprises a tubular carrier 52 whose outer diameter is slightly smaller than the diameter of the turbine housing bore 44 such that the carrier 52 can be slid axially into the bore 44 from its downstream end (i.e., slid right to left in FIG. 1). The bore 44 includes a radially inward step that faces downstream and the carrier includes a radially outwardly projecting flange or protuberance that abuts the step. A retainer clip or ring 56 is snapped into a groove in the inner surface of the bore 44 behind the carrier 52 to retain the carrier in the turbine housing. Thus, the carrier is prevented from moving axially in the bore 44 by the step and the retainer ring 56. It is also advantageous to include an anti-rotation feature (not shown) to prevent the carrier from rotating about its axis. The anti-rotation feature can comprise a keyed or spline arrangement between the carrier and the turbine housing, for example.

Figure 2:
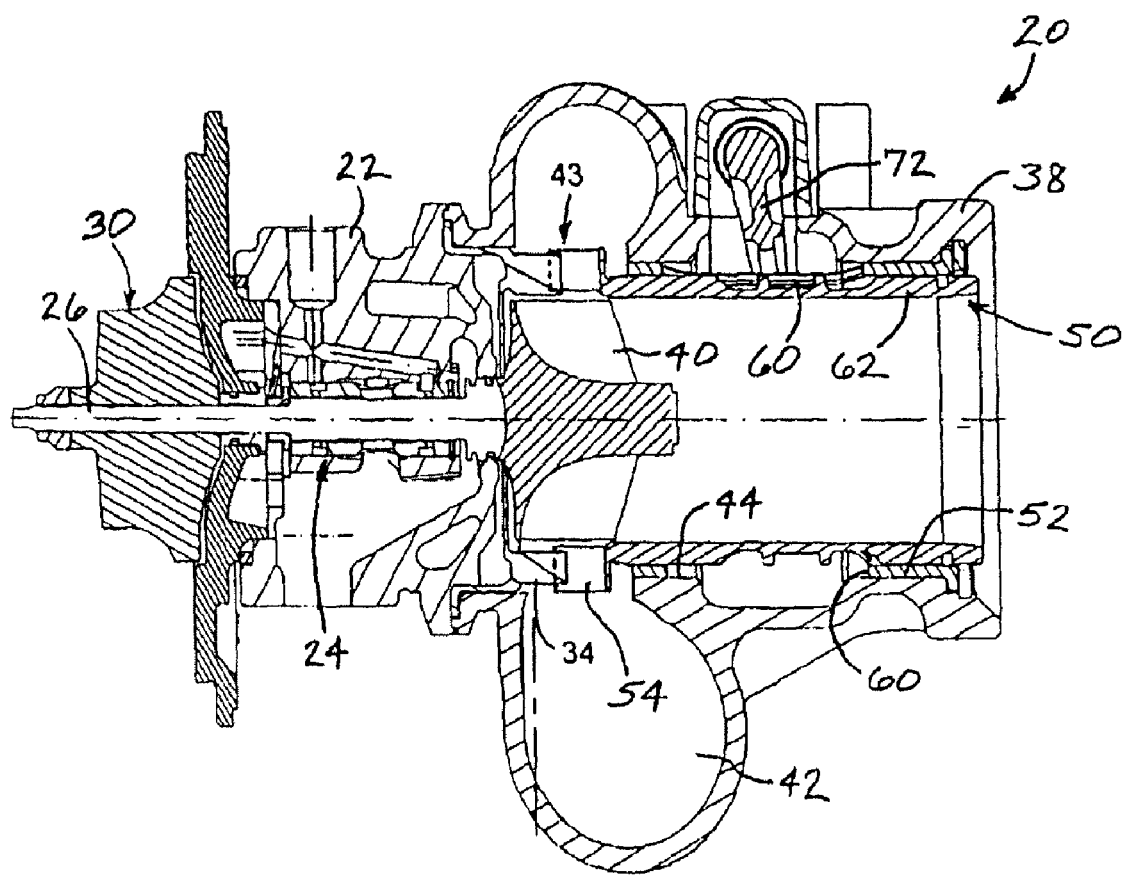
FIG. 2 is a view similar to FIG. 1, showing the piston in a partially open position.
Figure 2A:
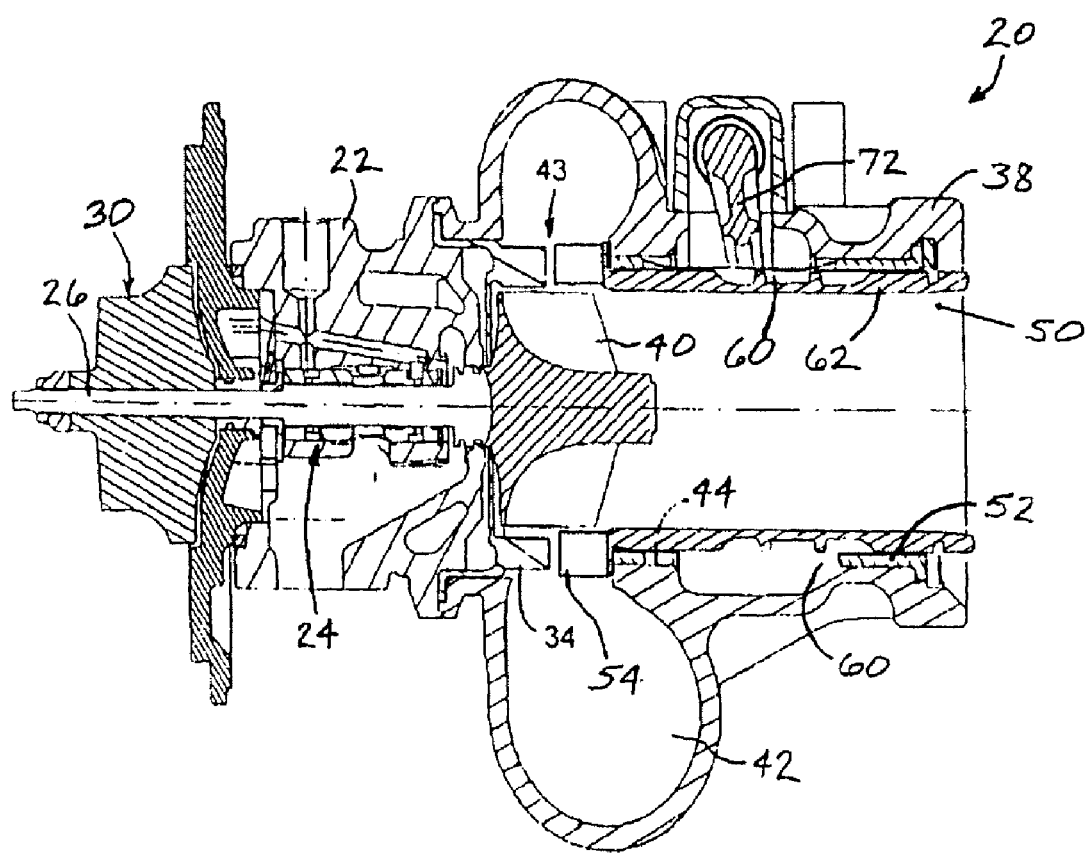
FIG. 2A is a view similar to FIG. 2, showing the piston fully open.
Figure 3:
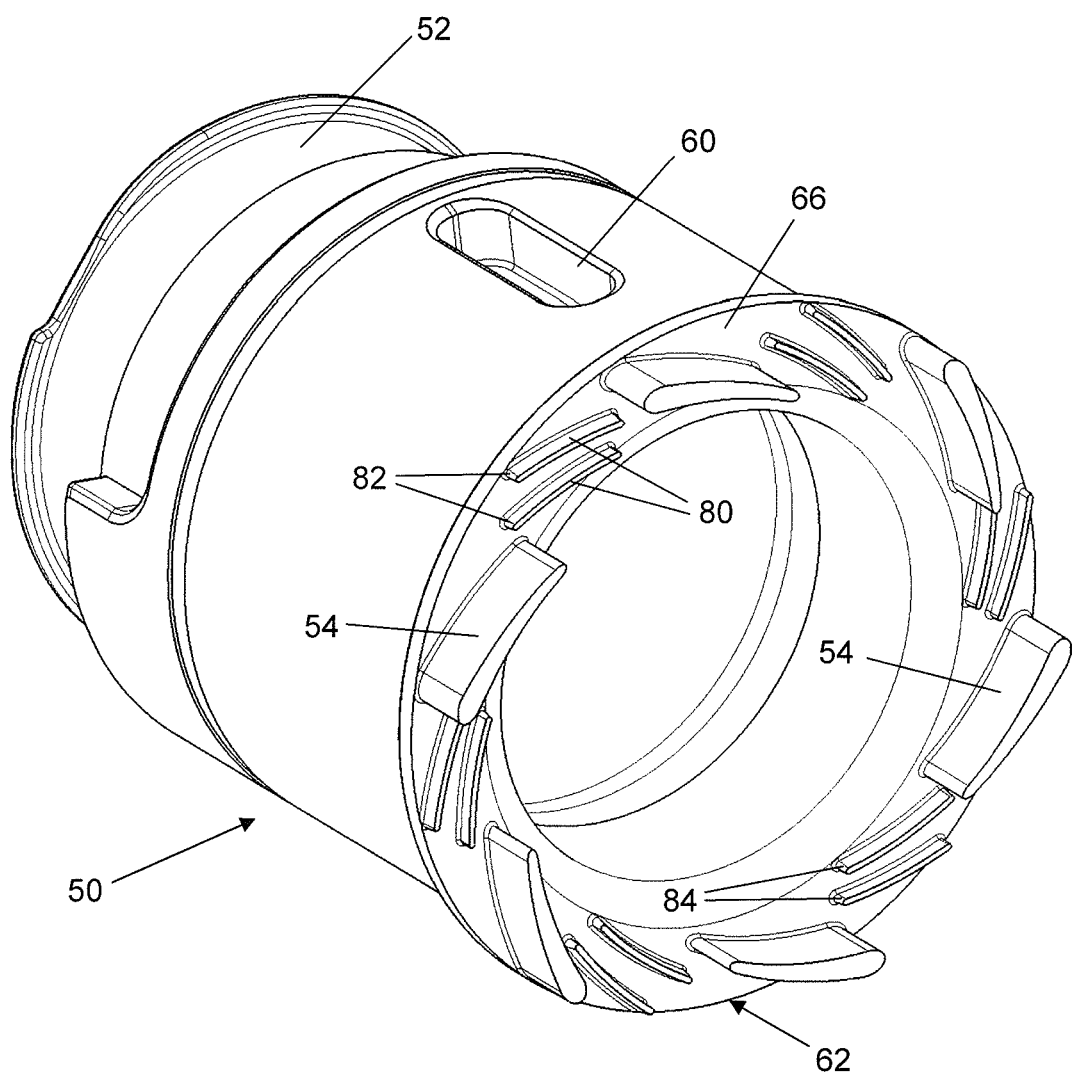
FIG. 3 is a perspective view of a piston assembly for the turbocharger in accordance with one embodiment of the invention.
Figure 4:
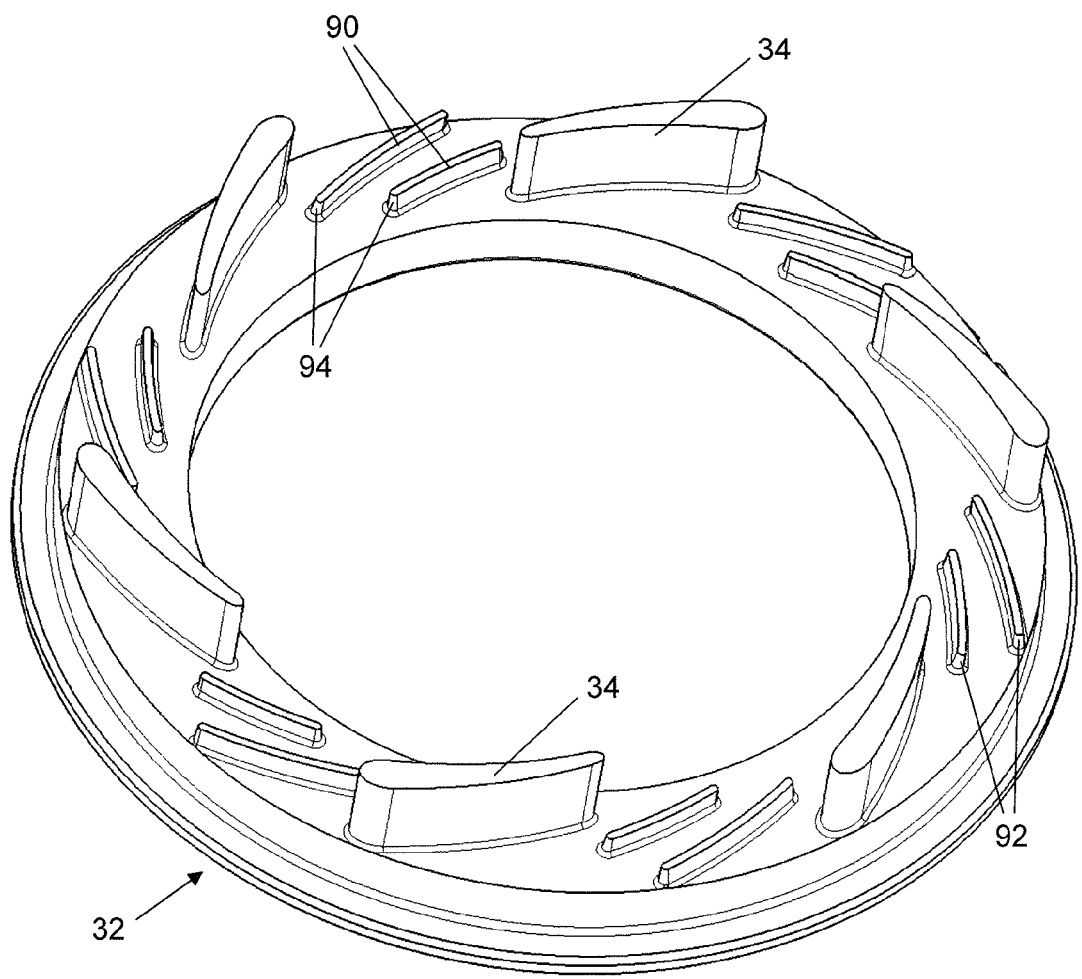
FIG. 4 is a perspective view of a heat shield in accordance with one embodiment of the invention.
Figure 5:
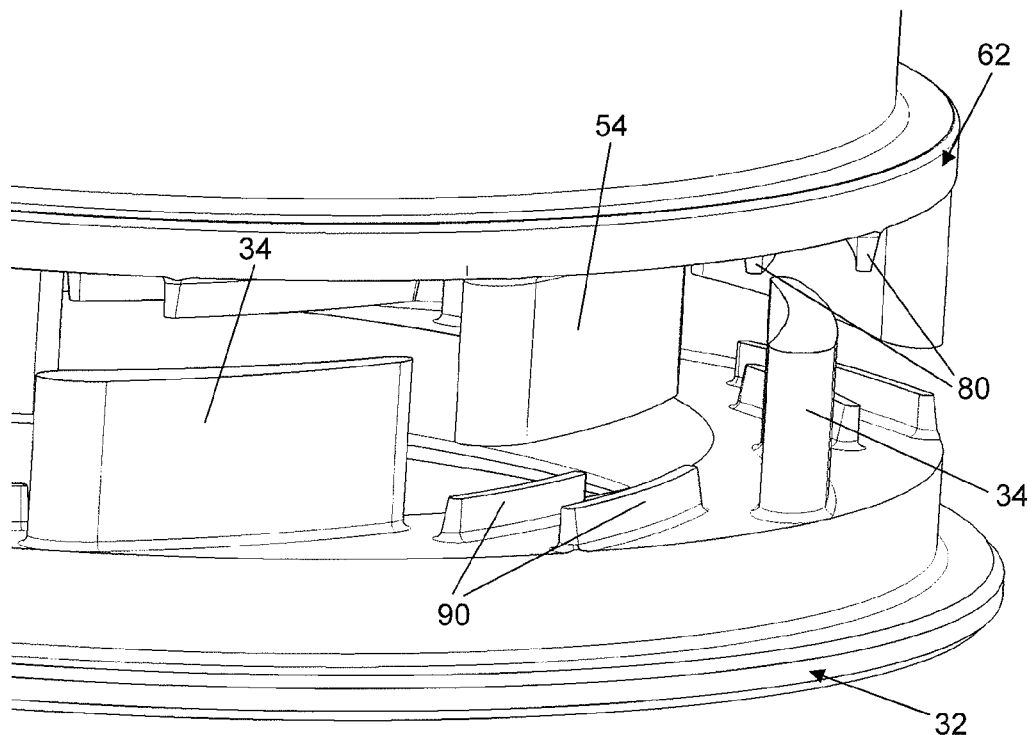
FIG. 5 is a perspective view illustrating the cooperation between the piston and heat shield in accordance with one embodiment of the invention.

The piston assembly 50 further comprises a piston 62 of tubular form. The piston is coaxially disposed within the central bore of the carrier 52 and is slidable relative to the carrier in the axial direction. The piston is axially slidable between a closed position as shown in FIG. 1 wherein the end of the piston abuts the free ends of the first vanes 34 or is closely adjacent thereto, a fully open position as shown in FIG. 2A wherein the end of the piston is spaced from the free ends of the vanes by a relatively larger distance, and various partially open positions such as shown in FIG. 2 wherein the piston is spaced by smaller distances from the vanes. The piston includes an anti-rotation device (e.g., keys or splines, not shown) that substantially prevents the piston from rotating about its axis while allowing it to translate axially. The piston comprises a tubular portion 64 whose outer diameter is slightly smaller than the inside diameter of the carrier 52 such that the tubular portion can be slid axially into the carrier from its upstream end (i.e., slid left to right in FIG. 1). The piston also includes a radially outwardly extending flange portion 66 that projects outwardly from the upstream end of the tubular portion 64.

The carrier 52 can have an axial split (not shown) extending the length of the carrier. The split enables the carrier to expand and contract in diameter in response to thermal effects or other causes. The carrier advantageously has an inner diameter only slightly greater than the outer diameter of the piston 62, such that a very small gap exists between the carrier and piston. Accordingly, leakage flow through the gap is minimized. Because the carrier can expand and contract in diameter, there is no need to make the gap large to facilitate assembly or to accommodate dimensional changes during operation. The ability of the carrier to expand also means that binding of the piston is avoided.

The carrier 52 includes a plurality of axially elongated apertures 60 through the side wall of the carrier. The turbocharger also includes a piston actuating linkage comprising a fork-shaped swing arm 70. The swing arm has a pair of arms 72 whose distal ends extend through two of the apertures 60 and engage the piston 62 at diametrically opposite locations of the piston. The swing arm is disposed adjacent the outer surface of the carrier and resides in a portion of the bore 44 that has an enlarged diameter. The swing arm is pivotable about a transverse axis so as to cause the piston to be advanced axially within the carrier 52. FIG. 1 shows the piston in the closed position, wherein the distal ends of the arms 72 are positioned toward one end of the apertures 60. FIG. 2A shows the piston in the fully open position in which the arms are positioned toward the other end of the apertures. The apertures are axially elongated to allow the requisite degree of axial travel of the arms 72. The swing arm 70 is actuated by an actuator mechanism coupled to an actuator such as a vacuum chamber actuator or the like (not shown).

As an alternative to having the piston actuating mechanism on the side of the piston as shown, it is possible to position the actuator behind the piston (to the right in FIG. 1). Such axially positioned actuator arrangements are known, one example of which is described in U.S. Pat. No. 6,694,733, the disclosure of which is incorporated herein by reference.

A set of second vanes 54 is affixed to the end of the piston, and specifically to the flange portion 66. The second vanes 54 extend in an opposite axial direction to that of the first vanes 34, toward the heat shield 32. As shown in FIG. 1, when the piston 62 is in a closed position (defined as the position in which there is the smallest axial spacing distance between the flange portion 66 of the piston and the wall of the nozzle formed by the heat shield 32), the free ends of the first vanes 34 abut or are closely adjacent the flange portion 66 of the piston, and similarly the free ends of the second vanes 54 abut or are closely adjacent the first wall formed by the heat shield 32 (or by another fixed component on which the first vanes may be mounted). Accordingly, when the piston is in the closed position as in FIG. 1, both the first and second vanes extend substantially fully across the open axial extent of the nozzle defined between the heat shield and the piston flange portion. It is also possible either to provide shallow recesses (not through-going holes or slots) in the fixed wall on which the first vanes are mounted such that the recesses receive the ends of the second vanes when the piston is closed, or to provide the recesses in the end face of the piston to receive the ends of the first vanes when the piston is closed (or the recesses could be provided in both the fixed wall and the piston). This would reduce the possibility of there being a slight gap if one or more vanes were slightly shorter than the others as a result of manufacturing tolerances.

The first vanes 34 are circumferentially spaced apart about a 360° annulus and likewise the second vanes 54 are circumferentially spaced about the 360° annulus. The second vanes 54 are circumferentially staggered relative to the first vanes 34, and the first vanes 34 overlap with the second vanes 54. The extent of the overlap depends on the position of the piston 62.

In one embodiment as illustrated, there are equal numbers of first and second vanes, and each second vane 54 is approximately midway, along a circumferential direction, between two first vanes 34.

In one embodiment as illustrated, the first and second vanes are substantially identical to one another in outer contour and vane axial length.

It has been discovered by the present inventors that when the piston starts in its fully closed position and begins to open such that a small gap begins to develop between the tips of the first vanes 34 and the surface of the piston flange 66, and a similar gap begins to develop between the tips of the second vanes 54 and the surface of the heat shield 32, the exhaust gas begins to leak through these gaps in a flow direction that is generally radial, i.e., not the desired flow direction. This results in a sudden increase in mass flow that is non-linear relative to the piston position during the first few millimeters of piston movement, and also results in a significant decrease in efficiency of the turbine. This makes it difficult to control the amount of boost provided to the engine during this initial opening of the piston because it is quite difficult to control the piston position precisely enough.

Figure 6:
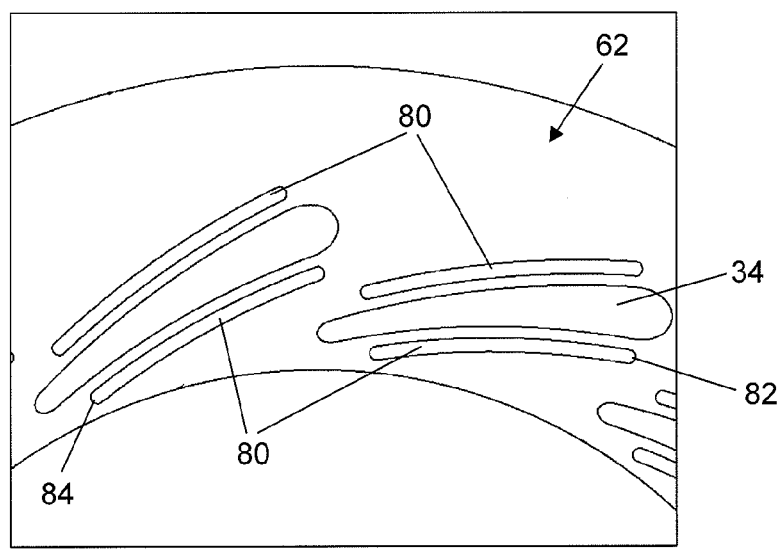
FIG. 6 depicts the cooperation between a vane and the associated leakage dams in accordance with one embodiment of the invention.

The present invention is aimed at alleviating these undesirable effects of the initial piston opening caused by leakage flow past the vane tips. In accordance with the invention, as illustrated in FIGS. 3 through 6, for each first vane 34 there is a pair of first leakage dams 80 formed as projections from the end of the piston 62. The first leakage dams 80 can be formed as elongate ribs of substantially smaller thickness and substantially smaller axial length than the first vanes. The first leakage dams 80 are positioned such that when the piston is fully closed, the tip of each first vane 34 is disposed between a pair of leakage dams, as illustrated in FIG. 6. One leakage dam extends generally parallel to the concave surface of the associated first vane, and the other leakage dam extends generally parallel to the convex surface of the first vane. The leakage dams 80 are spaced from the surfaces of the first vane along the circumferential direction. However, the circumferential distance between a given leakage dam 80 and the adjacent vane 34 on one side of the dam is substantially smaller than the circumferential distance between the dam and the neighboring vane 34 on the other side of the dam.

Similarly, for each second vane 54 there is a pair of second leakage dams 90 formed as projections from the surface of the heat shield 32 on which the first vanes 34 are mounted. The second leakage dams 90 can be formed as elongate ribs of substantially smaller thickness and substantially smaller axial length than the second vanes. The second leakage dams 90 are positioned such that when the piston is fully closed, the tip of each second vane 54 is disposed between a pair of leakage dams. One leakage dam extends generally parallel to the concave surface of the associated second vane, and the other leakage dam extends generally parallel to the convex surface of the second vane. The leakage dams 90 are spaced from the surfaces of the second vane along the circumferential direction. However, the circumferential distance between a given leakage dam 90 and the adjacent vane 54 on one side of the dam is substantially smaller than the circumferential distance between the dam and the neighboring vane 54 on the other side of the dam.

The leakage dams 80, 90 serve to significantly reduce the amount of leakage flow past the tips of the associated vanes 34, 54 as the piston just begins to open from its fully closed position. Accordingly, the mass flow increase as the piston opens is less sudden and controllability of the turbocharger is substantially improved relative to a turbocharger lacking the leakage dams. A further benefit is that the leakage dams increase the pressure between the ends of the vanes and the adjacent end walls when the piston is nearing the fully closed position, thereby reducing the axial force that must be exerted on the piston to open it.

As noted, the leakage dams 80, 90 have substantially smaller axial lengths than the vanes 34, 54 they are associated with. For example, the first leakage dams 80 can have an axial length that is about 5% to 20% of the axial length of the first vanes 34. Similarly, the second leakage dams 90 can have an axial length that is about 5% to 20% of the axial length of the second vanes 54.

The lengths of the first leakage dams 80 from their leading edges 82 to their trailing edges 84 (FIG. 6) as measured along the flow direction can be about 50% to 95% of the lengths of the first vanes along the flow direction. Similarly, the lengths of the second leakage dams 90 from their leading edges 92 to their trailing edges 94 (FIG. 4) can be about 50% to 95% of the lengths of the second vanes.

The thicknesses or widths of the leakage dams 80, 90, as noted, can be relatively small in comparison with the thicknesses of the vanes 34, 54. For example, each leakage dam can have a thickness of about 0.4 to 1.0 mm (more preferably 0.5 to 0.75 mm), whereas the vanes' maximum thickness near the leading edges can be on the order to 2 to 3 mm. In the illustrated embodiment, the thickness of each leakage dam is substantially constant along the length of the dam, but this is not essential.

The spacing distance (in a direction perpendicular to the length of the leakage dam) from each leakage dam to the associated vane when the piston is closed is preferably as small as practically possible while maintaining adequate clearance so the vane tip does not rub against one of the dams. For example, the spacing can be about 0.4 to 0.6 mm.

In operation, starting with the piston in its closed position, the tips of the first vanes 34 are disposed between the respective pairs of first leakage dams 80, and the tips of the second vanes 54 are disposed between the respective pairs of second leakage dams 90. There is little or no gap between each vane tip and the wall on which the leakage dams are formed. As the piston just begins to be moved toward the open position, gaps between the vane tips and the walls begin to form or increase. Without the leakage dams, it has been found that exhaust gas near the vane tips deviates from its normal desired flow direction and follows the path of least resistance in a generally radial direction between the ends of the vane tips and the adjacent wall, resulting in a sudden increase in mass flow and poor efficiency as previously noted. In contrast, the leakage dams discourage such flow deviation. While some gas can still flow over the dams past the vane tips, the dams significantly reduce the amount of such deviated gas flow. Improved controllability of the turbocharger results.

The embodiment of the turbocharger described thus far has two leakage dams for each associated vane. Thus, for example, if there are six vanes 34, then there are six pairs of (12 total) leakage dams 80, and likewise if there are six vanes 54, then there are six pairs of (12 total) leakage dams 90. However, it is also within the scope of the invention to employ only one leakage dam per vane. Each leakage dam can be adjacent either the convex side or the concave side of the associated vane (or, conceivably, some could be adjacent the convex sides and others could be adjacent the concave sides).

It is also within the scope of the invention to provide a turbocharger that has only one set of vanes, and to provide one or two leakage dams for each such vane. For example, the turbocharger can include only the first vanes 34 on the heat shield 32, while the piston 62 has no vanes. In this case, the piston flange 66 has one or two leakage dams 80 generally as already described. Alternatively, the turbocharger can include only the second vanes 54 on the piston flange 66, while the heat shield 32 has no vanes. In this case, the heat shield 32 has one or two leakage dams 90 generally as already described.

Thus, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger comprising:
   a compressor wheel affixed to one end of a shaft;
   a center housing containing a bearing assembly for the shaft;
   a turbine wheel affixed to an opposite end of the shaft and disposed in a bore of a turbine housing coupled to one side of the center housing, the turbine housing defining a chamber surrounding the turbine wheel, and a turbine nozzle being defined between fixed axially spaced first and second walls such that exhaust gas flows from the chamber through the turbine nozzle into the turbine wheel;

a sliding piston disposed in the bore of the turbine housing such that the piston is axially slidable between a closed position and an open position, the piston having an end that is spaced from the first wall by a relatively small distance in the closed position of the piston and by a relatively large distance in the open position of the piston, an open axial extent of the nozzle being defined between the first wall and the end of the piston;

a set of circumferentially spaced first vanes mounted on the first wall and each projecting in one axial direction toward the second wall and terminating at a tip;

a set of circumferentially spaced second vanes mounted on the end of the piston and each projecting in an opposite axial direction toward the first wall and terminating at a tip;

the first vanes being circumferentially staggered relative to the second vanes and overlapping the second vanes at least when the piston is closed and partially open;

a pair of first leakage dams for every first vane, formed as projections from the end of the piston in a direction generally toward the first wall and having axial lengths substantially smaller than the first vanes, each said pair being positioned such that the tip of the respective first vane is between the two first leakage dams when the piston is fully closed; and a pair of second leakage dams for every second vane, formed as projections from the first wall in a direction generally toward the second wall and having axial lengths substantially smaller than the second vanes, each said pair being positioned such that the tip of the respective second vane is between the two second leakage dams when the piston is fully closed.

2. The turbocharger of claim 1, wherein the first and second leakage dams comprise elongate ribs extending generally parallel to a flow direction through the first and second vanes, respectively.

3. The turbocharger of claim 2, wherein the ribs have a thickness substantially less than a thickness of the first and second vanes.

4. The turbocharger of claim 1, wherein each pair of first leakage dams is approximately midway in a circumferential direction between two second vanes.

5. The turbocharger of claim 4, wherein each pair of second leakage dams is approximately midway in a circumferential direction between two first vanes.

6. The turbocharger of claim 1, wherein the first vanes have a length from a leading edge to a trailing edge of each first vane, and the first leakage dams have a length from a leading edge to a trailing edge of each first leakage dam, the length of the first leakage dams being about 50% to about 95% of the length of the first vanes.

7. The turbocharger of claim 1, wherein the second vanes have a length from a leading edge to a trailing edge of each second vane, and the second leakage dams have a length from a leading edge to a trailing edge of each second leakage dam, the length of the second leakage dams being about 50% to about 95% of the length of the second vanes.

8. The turbocharger of claim 1, wherein the first vanes have an axial length from the first wall to the tips of the first vanes, and the first leakage dams have an axial length that is about 5% to 20% of the axial length of the first vanes.

9. The turbocharger of claim 1, wherein the second vanes have an axial length from the end of the piston to the tips of the second vanes, and the second leakage dams have an axial length that is about 5% to 20% of the axial length of the second vanes.

10. A turbocharger comprising:
a compressor wheel affixed to one end of a shaft;
a center housing containing a bearing assembly for the shaft;
a turbine wheel affixed to an opposite end of the shaft and disposed in a bore of a turbine housing coupled to one side of the center housing, the turbine housing defining a chamber surrounding the turbine wheel, and a turbine nozzle being defined between fixed axially spaced first and second walls such that exhaust gas flows from the chamber through the turbine nozzle into the turbine wheel;
a sliding piston disposed in the bore of the turbine housing such that the piston is axially slidable between a closed position and an open position, the piston having an end that is spaced from the first wall by a relatively small distance in the closed position of the piston and by a relatively large distance in the open position of the piston, an open axial extent of the nozzle being defined between the first wall and the end of the piston;
a set of circumferentially spaced vanes mounted on the first wall and each projecting in an axial direction toward the second wall and terminating at a tip; and
a pair of leakage dams for every vane, formed as projections from the end of the piston in a direction generally toward the first wall and having axial lengths substantially smaller than the vanes, each said pair being positioned such that the tip of the respective vane is between the two leakage dams when the piston is fully closed.

11. The turbocharger of claim 10, wherein the leakage dams comprise elongate ribs extending generally parallel to a flow direction through the vanes.

12. The turbocharger of claim 11, wherein the ribs have a thickness substantially less than a thickness of the vanes.

13. The turbocharger of claim 10, wherein the vanes have a length from a leading edge to a trailing edge of each vane, and the leakage dams have a length from a leading edge to a trailing edge of each leakage dam, the length of the leakage dams being about 50% to about 95% of the length of the vanes.

14. The turbocharger of claim 10, wherein the vanes have an axial length from the first wall to the tips of the vanes, and the leakage dams have an axial length that is about 5% to 20% of the axial length of the vanes.

15. A turbocharger comprising:
a compressor wheel affixed to one end of a shaft;
a center housing containing a bearing assembly for the shaft;
a turbine wheel affixed to an opposite end of the shaft and disposed in a bore of a turbine housing coupled to one side of the center housing, the turbine housing defining a chamber surrounding the turbine wheel, and a turbine nozzle being defined between fixed axially spaced first and second walls such that exhaust gas flows from the chamber through the turbine nozzle into the turbine wheel;
a sliding piston disposed in the bore of the turbine housing such that the piston is axially slidable between a closed position and an open position, the piston having an end that is spaced from the first wall by a relatively small distance in the closed position of the piston and by a relatively large distance in the open position of the piston, an open axial extent of the nozzle being defined between the first wall and the end of the piston;

a set of circumferentially spaced vanes mounted on the end of the piston wall and each projecting in an axial direction toward the first wall and terminating at a tip; and a pair of leakage dams for every vane, formed as projections from the first wall in a direction generally toward the second wall and having axial lengths substantially smaller than the vanes, each said pair being positioned such that the tip of the respective vane is between the two leakage dams when the piston is fully closed.

16. The turbocharger of claim 15, wherein the leakage dams comprise elongate ribs extending generally parallel to a flow direction through the vanes.

17. The turbocharger of claim 15, wherein the vanes have a length from a leading edge to a trailing edge of each vane, and the leakage dams have a length from a leading edge to a trailing edge of each leakage dam, the length of the leakage dams being about 50% to about 95% of the length of the vanes.

18. The turbocharger of claim 15, wherein the vanes have an axial length from the end of the piston to the tips of the vanes, and the leakage dams have an axial length that is about 5% to 20% of the axial length of the vanes.

19. A turbocharger comprising:
a compressor wheel affixed to one end of a shaft;
a center housing containing a bearing assembly for the shaft;
a turbine wheel affixed to an opposite end of the shaft and disposed in a bore of a turbine housing coupled to one side of the center housing, the turbine housing defining a chamber surrounding the turbine wheel, and a turbine nozzle being defined between fixed axially spaced first and second walls such that exhaust gas flows from the chamber through the turbine nozzle into the turbine wheel;
a sliding piston disposed in the bore of the turbine housing such that the piston is axially slidable between a closed position and an open position, the piston having an end that is spaced from the first wall by a relatively small distance in the closed position of the piston and by a relatively large distance in the open position of the piston, an open axial extent of the nozzle being defined between the first wall and the end of the piston;
a set of circumferentially spaced vanes mounted on the first wall and each projecting in an axial direction toward the second wall and terminating at a tip; and
at least one leakage dam for every vane, the leakage dams formed as projections from the end of the piston in a direction generally toward the first wall and having axial lengths substantially smaller than the vanes, each leakage dam being positioned adjacent to the tip of the respective vane when the piston is fully closed, a circumferential distance from each leakage dam to the respective vane on one side of the leakage dam being substantially smaller than a circumferential distance to the vane on the opposite side of the leakage dam.

20. The turbocharger of claim 19, wherein the leakage dams comprise elongate ribs extending generally parallel to a flow direction through the vanes.

21. The turbocharger of claim 19, wherein the vanes have a length from a leading edge to a trailing edge of each vane, and the leakage dams have a length from a leading edge to a trailing edge of each leakage dam, the length of the leakage dams being about 50% to about 95% of the length of the vanes.

22. The turbocharger of claim 19, wherein the vanes have an axial length from the first wall to the tips of the vanes, and the leakage dams have an axial length that is about 5% to 20% of the axial length of the vanes.

23. A turbocharger comprising:
a compressor wheel affixed to one end of a shaft;
a center housing containing a bearing assembly for the shaft;
a turbine wheel affixed to an opposite end of the shaft and disposed in a bore of a turbine housing coupled to one side of the center housing, the turbine housing defining a chamber surrounding the turbine wheel, and a turbine nozzle being defined between fixed axially spaced first and second walls such that exhaust gas flows from the chamber through the turbine nozzle into the turbine wheel;
a sliding piston disposed in the bore of the turbine housing such that the piston is axially slidable between a closed position and an open position, the piston having an end that is spaced from the first wall by a relatively small distance in the closed position of the piston and by a relatively large distance in the open position of the piston, an open axial extent of the nozzle being defined between the first wall and the end of the piston;
a set of circumferentially spaced vanes mounted on the end of the piston and each projecting in an axial direction toward the first wall and terminating at a tip; and
at least one leakage dam for every vane, the leakage dams formed as projections from the first wall in a direction generally toward the second wall and having axial lengths substantially smaller than the vanes, each leakage dam being positioned adjacent to the tip of the respective vane when the piston is fully closed, a circumferential distance from each leakage dam to the respective vane on one side of the leakage dam being substantially smaller than a circumferential distance to the vane on the opposite side of the leakage dam.

24. The turbocharger of claim 23, wherein the leakage dams comprise elongate ribs extending generally parallel to a flow direction through the vanes.

25. The turbocharger of claim 23, wherein the vanes have an axial length from the first wall to the tips of the vanes, and the leakage dams have an axial length that is about 5% to 20% of the axial length of the vanes.

* * * * *